United States Patent [19]
Tamai et al.

[11] Patent Number: 5,291,414
[45] Date of Patent: Mar. 1, 1994

[54] NAVIGATION SYSTEM FOR GUIDING A VEHICLE ALONG A PRECOMPUTED OPTIMAL ROUTE

[75] Inventors: Haruhisa Tamai, Sunnyvale, Calif.; Tatsuhiko Abe, Saitama, Japan

[73] Assignee: Zexel Corporation Diahatsu-Nissan Ikebukuro, Tokyo, Japan

[21] Appl. No.: 868,483

[22] Filed: Apr. 14, 1992

[51] Int. Cl.⁵ ............................................. G06F 15/50
[52] U.S. Cl. .................................... 364/449; 364/444; 340/990; 340/995
[58] Field of Search ...................... 364/443, 444, 449; 73/178 R; 340/988, 990, 995

[56] References Cited
U.S. PATENT DOCUMENTS

| | | | |
|---|---|---|---|
| 4,796,189 | 1/1989 | Nakayama et al. | 340/990 |
| 4,926,336 | 5/1990 | Yamada | 364/449 |
| 4,937,753 | 6/1990 | Yamada | 340/990 |
| 4,954,959 | 9/1990 | Moroto et al. | 364/449 |
| 4,984,168 | 1/1991 | Neukrichner et al. | 364/449 |
| 5,036,471 | 7/1991 | Tamura et al. | 364/449 |
| 5,041,983 | 8/1991 | Nakahara et al. | 364/449 |
| 5,107,433 | 4/1992 | Helldörfer et al. | 340/990 |

*Primary Examiner*—Gary Chin
*Attorney, Agent, or Firm*—Thomas R. Morrison

[57] ABSTRACT

When a vehicle has deviated from a computer-determined optimal route from a starting point to a destination, a navigation system warns the vehicle driver that he is off the optimal route, picks an appropriate direction for continued travel, selects a new starting point, and computes a new optimal route from the new starting point to the destination. By selecting the new starting point based on the vehicle's present location and the time to recompute a new optimal route, the system eliminates the necessity for a driver either to go back to the original optimal route, to recompute the optimal route by a manual operation, or to recompute a new optimal route more than once.

11 Claims, 3 Drawing Sheets

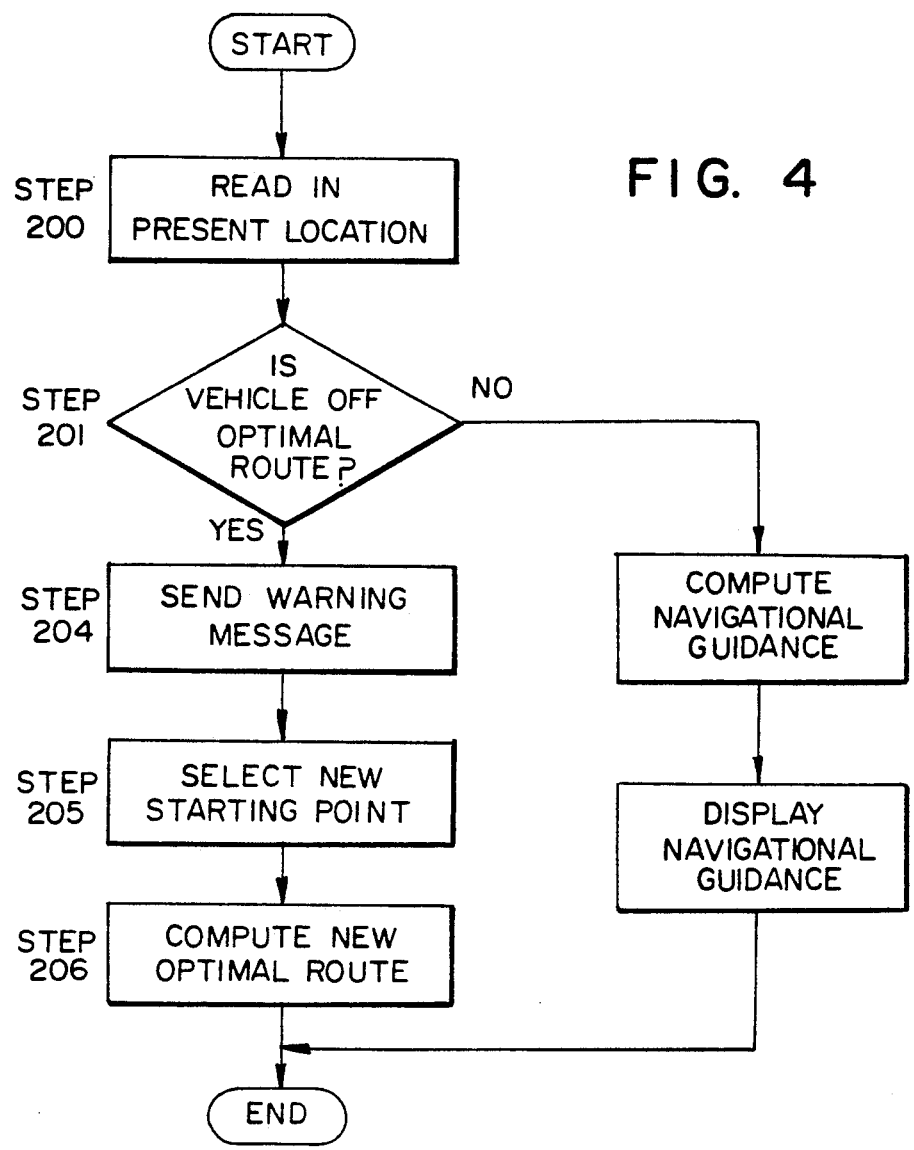
FIG. 4
FIG. 5A
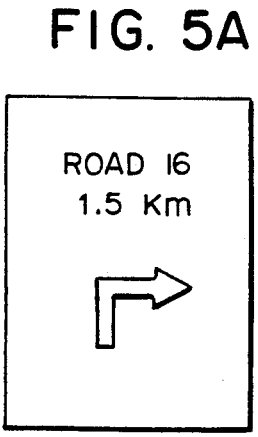
FIG. 5B
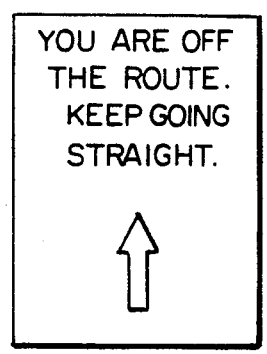
FIG. 5C
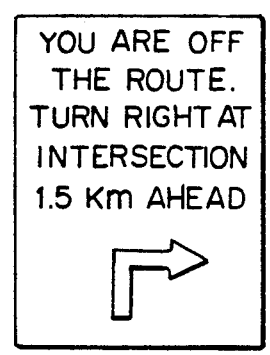

NAVIGATION SYSTEM FOR GUIDING A VEHICLE ALONG A PRECOMPUTED OPTIMAL ROUTE

BACKGROUND OF THE INVENTION

The present invention relates to vehicle navigation systems, and, more particularly, to a system for guiding a vehicle along an optimal route computed beforehand.

Generally, a vehicle navigation system computes from map data the optimal route from a starting point to a destination before starting a journey. En route, the system computes local directions along the optimal route with reference to the vehicle's present location in real time. The system guides the vehicle's navigation from a starting point to a destination by displaying route information in real time on a CRT.

When a vehicle travels, the driver may overlook navigational guidance on the display and thereby deviate from the optimal route. In such cases conventional navigation systems call either for bringing the vehicle back to the optimal route, a necessary condition before navigational guidance can be resumed, or, as described in Japanese Laid-Open Patent Publication No. 51015/1990, for manually activating recomputation of a new optimal route.

However, it is difficult for a driver who is unfamiliar with a local road network to return to the optimal route once he has strayed from it. It is also a considerable inconvenience for a driver to recompute the optimal route while driving.

OBJECTS AND SUMMARY OF THE INVENTION

An object of the present invention is to provide a vehicle navigation system that overcomes the drawbacks of the prior art.

A further object of the present invention is to provide a vehicle navigation system that will keep a vehicle on a pre-computed optimal route even when there is a deviation because of driver error.

Still a further object of the present invention is to provide a vehicle navigation system that can overcome a driver's error or inattention.

Briefly stated, the present invention provides a navigation system that, when a vehicle has deviated from a computer-determined optimal route from a starting point to a destination, warns the vehicle driver that he is off the optimal route, picks an appropriate direction for continued travel, selects a new starting point, and computes a new optimal route from the new starting point to the destination. By selecting the new starting point based on the vehicle's present location and the time to recompute a new optimal route, the system eliminates the necessity for a driver either to go back to the original optimal route, to recompute the optimal route by a manual operation, or to recompute a new optimal route more than once.

According to an embodiment of the invention, a vehicle navigation system comprises: means for storing and retrieving map data; first means for detecting a present location of a vehicle; manually operated means for sending a command signal effective for commanding computation of a route; means, responsive to the means for sending, for computing from the map data an optimal route for the vehicle from a starting point to a destination; means for guiding the vehicle along the optimal route; second means for detecting a deviation of the vehicle from the optimal route; the second detecting means effective to signal the deviation; means for displaying information effective to indicate that the vehicle is off the original optimal route when the second means for detecting signals the deviation; the means for computing effective to recompute the optimal route, in response to a deviation signal from the second means for detecting when the deviation is detected; means for selecting a new starting point for the optimal route; and the new starting point being selected to be forward of the present location of the vehicle at a distance sufficient that a recomputation of the optimal route is completed before the vehicle arrives at the new starting point.

According to a feature of the invention, a vehicle navigation system comprises: a CD ROM for storing and retrieving map data; a manually operated touch-screen switch effective to send a signal for commanding computation of a route; a shaft sensor; a terrestrial magnetism sensor; the shaft sensor and the terrestrial magnetism sensor cooperating to detect a present location of a vehicle; a microcomputer; the microcomputer including means for computing from the map data an optimal route for the vehicle from a starting point to a destination; the microcomputer further including means for guiding the vehicle along the optimal route; the shaft sensor, the terrestrial magnetism sensor, and the microcomputer cooperating to detect a deviation of the vehicle from the optimal route; the microcomputer including means for signalling the deviation; a CRT display including means for indicating that the vehicle is off the optimal route when the microcomputer signals the deviation; the microcomputer including means for recomputing the optimal route when the deviation is detected; the microcomputer further including means for selecting a new starting point for the optimal route; and the new starting point being selected to be forward of the present location of the vehicle at a distance sufficient that a recomputation of the optimal route is completed before the vehicle arrives at the new starting point.

The above, and other objects, features and advantages of the present invention will become apparent from the following description read in conjunction with accompanying drawings, in which like reference numerals designate the same elements.

BRIEF DESCRIPTION OF THE DRAWINGS

FIG. 4 is a flow chart illustrating computation of local navigational guidance and of an optimal route when a vehicle is off the original optimal route.

FIG. 5 shows the display screen of the system of the present invention. FIG. 5(A) is an example of local navigational guidance when the vehicle is on the optimal route. FIG. 5(B) is an example of what is displayed when the vehicle is off the optimal route and can continue straight ahead. FIG. 5(C) is an example of what is displayed when the vehicle is off the optimal route and cannot continue straight ahead.

DETAILED DESCRIPTION OF THE PREFERRED EMBODIMENTS

Figure 1:
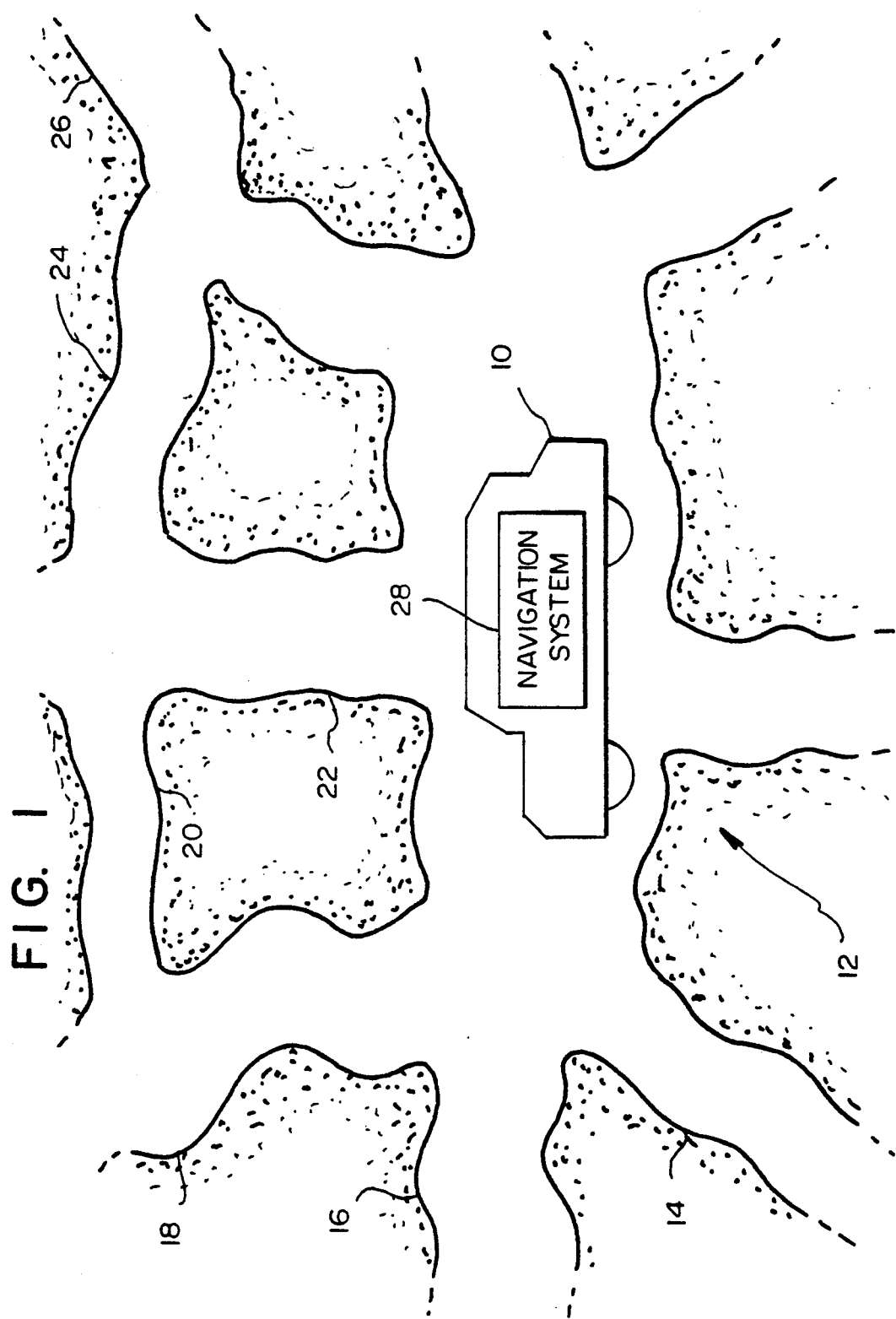
FIG. 1 is a simplified view of a vehicle moving over a road network. The vehicle has installed a navigation system of the present invention.

Referring to FIG. 1, a vehicle 10 moves over a road network 12 consisting of a plurality of roads 14-26. Vehicle 10 has installed therein a navigation system 28 that contains the apparatus of this invention.

Figure 2:
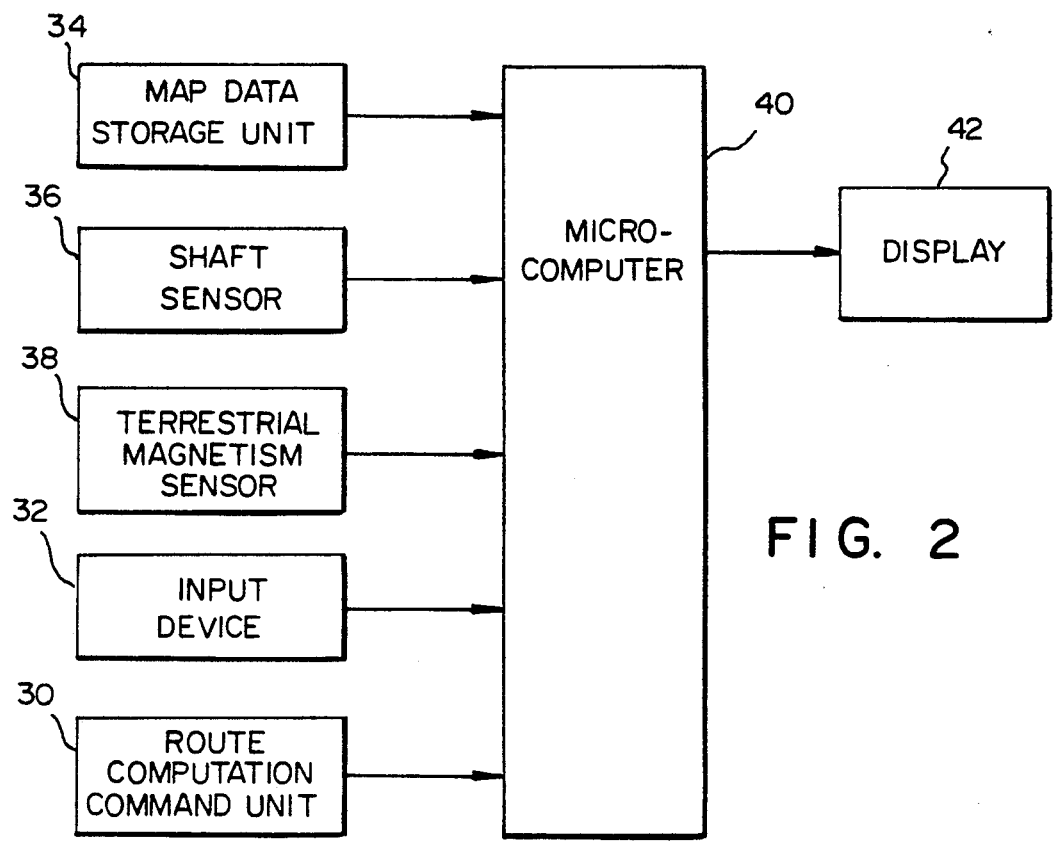
FIG. 2 is a schematic view of an embodiment of the system of the present invention.

Referring to FIG. 2, a driver of vehicle 10 initiates computation of an optimal route in navigation system 28 by instructing a route computation command unit 30. With the instruction to compute, the driver enters route data through input device 32. This data always specifies a destination; it may or may not specify a starting location. From two inputs: map data, retrieved from a map data storage unit 34, and either present location data, communicated from a shaft sensor 36 and a terrestrial magnetism sensor 38, or a specified starting location, entered by the driver into input device 32, a microcomputer 40 computes an optimal route.

Map data storage unit 34 is comprised of such media as CD-ROMs or IC cards with map data written thereon, the map data including road network data and address data. Microcomputer 40, after computing an optimal route, computes navigational guidance for the optimal route and sends the navigational guidance to a display 42 comprised of a CRT or other means for displaying data on a screen.

Figure 3:
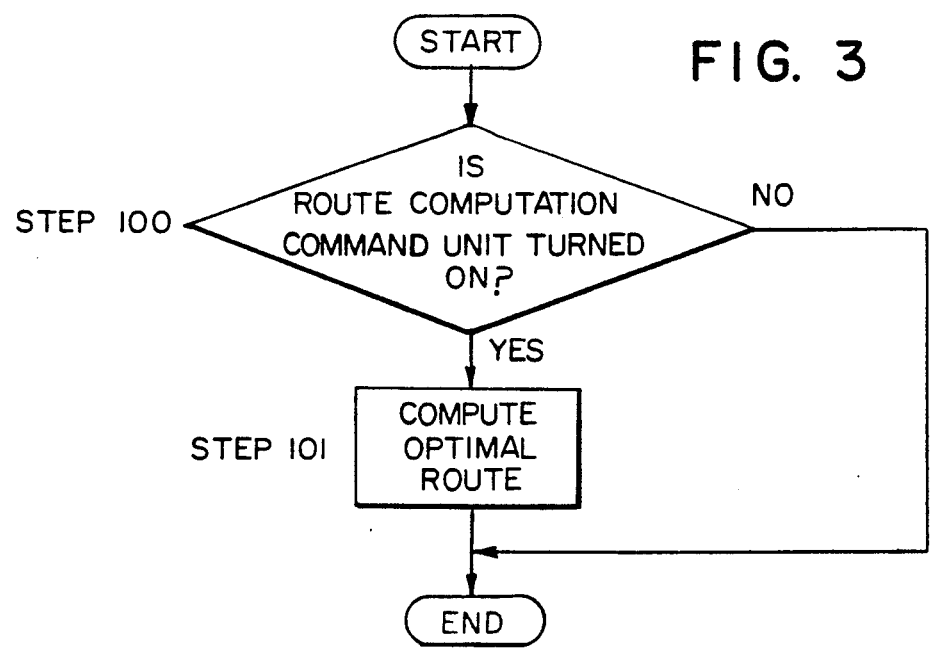
FIG. 3 is a flow chart illustrating manual operation for computation of the optimal route.

Referring to FIG. 3, the program shown in the flow chart is executed at specified time intervals to compute an optimal route. When route computation command unit 30 is turned on (Step 100) after a vehicle's starting point and destination have been entered through input device 32, microcomputer 40 computes the optimal route from the starting point to the destination according to map data in map data storage unit 34 (Step 101). The optimal route is computed to make the distance or the period of time from a starting point to a destination shortest or to require the fewest number of turns. The starting point may be the vehicle's present location instead of a point manually entered through input device 32.

Referring to FIG. 4, local navigational guidance is computed by a program that starts by reading in the present location of vehicle 10 (Step 200). The present location of vehicle 10 is computed by microcomputer 40 in real time from signals from terrestrial magnetism sensor 38 and shaft sensor 36. Microcomputer 40 determines the forward direction of vehicle 10 from terrestrial magnetism sensor 38 and the distance travelled by vehicle 10 from shaft sensor 36. The present location of vehicle 10 is based on the computed direction and the distance travelled.

Present location of vehicle 10 may also be computed from the GPSS (Global Positioning System with Satellite), using three or four satellites.

Next a decision is made, based on the present location, whether vehicle 10 is on or off the optimal route (Step 201). Where vehicle 10 is on the optimal route, microcomputer 40 computes navigational guidance (Step 202) and sends it to display 42. Display 42 then presents the information as an image (Step 203).

The navigational guidance consists of information necessary to guide vehicle 10 from its starting point to the destination along the optimal route. In the present embodiment, the navigational guidance displayed comprises, as shown in FIG. 5(A), the name of the road into which vehicle 10 should turn immediately it leaves the road currently traversed (e.g., Road 16 as in FIG. 5(A)), a distance between vehicle 10's present location and the next road (e.g., 1.5 km.), and an arrow representing the direction of the turn into the next road. Navigational guidance is continuously recomputed and updated from the present location of vehicle 10 as it travels. Under normal conditions, an image on display 42 is updated immediately after vehicle 10 proceeds into the road whose name has just been displayed. Local navigational guidance is thus presented from vehicle 10's starting point to the destination by repeating the above procedure. However, display of the distance from the present location of vehicle 10 to the next road is updated only at specified intervals, for example, every 500 m, according to the present embodiment.

Where vehicle 10 is off the optimal route, the program sends warning information to display 42 to be displayed thereon (Step 204). In most cases, the messages that give the warning information are written into the internal memory of microcomputer 40 in advance. According to the present embodiment, the system displays a message that reads "You are off the route. Keep going straight." and an arrow indicating a straight course, as in FIG. 5(B).

After sending the warning, the program determines a new starting point from which to compute a new optimal route to the destination (Step 205). Although vehicle 10's present location could be the new starting point, the present embodiment selects another point ahead of vehicle 10.

The reason not to use the present location as the new starting point is that computing a new optimal route generally requires several seconds. Therefore vehicle 10 will move a certain distance while an optimal route is being computed. Were vehicle 10's present location to be the new starting point and the recomputed optimal route to require a turn at an intersection close to the new starting point, vehicle 10 might have passed through the intersection by the time the recomputation is completed. As a result, vehicle 10 would be off the new optimal route, and the optimal route would have to be recomputed once more. Vehicle 10 might never regain an optimal route if its present location were the starting point for a recomputation, because consecutive recomputations would each find vehicle 10 beyond its turning point by the time they finished.

In order to prevent such an outcome, the present embodiment selects as the new starting point a geographic point located on the route currently travelled by the vehicle and at a specified distance ahead of vehicle 10's location as of the time it deviated from the optimal route. The distance to the new starting point is calculated based on the velocity of vehicle 10 at its present location and the time required to compute the optimal route. Vehicle 10's velocity is calculated from signals from shaft sensor 12, and the time to recompute the optimal route is estimated from the straight-line distance between the new starting point and the destination.

Where vehicle 10 cannot go straight, for example, because there is a T-junction ahead, the warning display shows an arrow indicating either a right or a left turn, whichever is more convenient for an approach to the destination, and a distance to the T-junction instead of the message "Keep going straight." (See FIG. 5(C).)

Next the new optimal route from the new starting point to the destination is computed from map data drawn from map data storage unit 34 (Step 206), as in Step 101 of the program flowcharted in FIG. 3. The destination for this recomputation is the same.

After the recomputation, when vehicle 10 has followed the route according to the warning of the deviation and has reached the new starting point, normal navigational guidance is resumed. In other words, Steps 202 and 203 are repeated.

Referring to FIG. 5, three examples of a visual display of the present embodiment are presented. FIG. 5(A) shows an example of local navigational guidance when the vehicle is on the optimal route; FIG. 5(B), local navigational guidance when the vehicle is off the optimal route and can keep going straight; FIG. 5(C), local navigational guidance when the vehicle is off the optimal route and cannot keep going straight because of a T-junction or other interference.

According to the above embodiment, local navigational guidance from vehicle 10's present location is computed and displayed on display 42 in the form of an image. However, navigational guidance may be given by displaying, on display 42, road network 12, with the optimal route in a different color, and the present location of vehicle 10. Alternatively, the display may be voice instead of image, or voice and image may be jointly presented.

As explained above, navigation system 28, according to the present embodiment, can determine a new starting point when vehicle 10 is off the optimal route and automatically recompute the optimal route from the new starting point to the destination. Therefore, it is not necessary to retrace the road to return to the original optimal route nor to manually activate recomputation of the optimal route. Consequently, the system is effective in alleviating difficulties for a driver and in improving driving safety.

To summarize the present invention, when route computation command unit 30 is turned on, microcomputer 40 computes from map data in map data storage unit 34 the optimal route for vehicle 10 to travel from a starting point to a destination. From the computed optimal route and vehicle 10's present location as computed from signals sent by appropriate sensors, local navigational guidance is determined and presented.

Deviation detecting means determines from the optimal route and the present location of vehicle 10 whether it is on or off the optimal route. Where vehicle 10 has deviated from the optimal route, signals from the deviation detecting means cause the selection of a new starting point based on the vehicle's present location and the recomputation of a new optimal route from the new starting point to the destination. The driver of vehicle 10 is also warned of the deviation and given new directions.

Having described a preferred embodiment of the invention, it is to be understood that the invention is not limited to that precise embodiment, and that various changes and modifications may be effected therein by one skilled in the art without departing from the scope or spirit of the invention as defined in the appended claims.

What is claimed is:

1. A vehicle navigation system, which comprises:
   means for storing and retrieving map data;
   first means for detecting a present location of a vehicle;
   manually operated means for sending a command signal effective for commanding computation of a route;
   means, responsive to said means for sending, for computing from said map data an optimal route for said vehicle from a starting point to a destination;
   means for guiding said vehicle along said optimal route;
   second means for detecting a deviation of said vehicle from said optimal route;
   said second detecting means effective to signal said deviation;
   means for displaying information effective to indicate that said vehicle is off said optimal route when said second means for detecting signals said deviation;
   said means for computing effective to recompute said optimal route, in response to a deviation signal from said second means for detecting when said deviation is detected;
   means for selecting a new starting point for said recomputed optimal route; and
   said new starting point being selected to be forward of said present location of said vehicle at a distance which is sufficient to ensure that a recomputation of said optimal route is completed before said vehicle arrives at said new starting point.

2. A vehicle navigation system as in claim 1, wherein said means for storing and retrieving includes a remote computer database.

3. A vehicle navigation system as in claim 1, wherein said means for computing includes a microcomputer.

4. A vehicle navigation system as in claim 1, wherein said first detecting means includes in combination a shaft sensor and a terrestrial magnetism sensor.

5. A vehicle navigation system as in claim 1, wherein said second detecting means includes in combination a shaft sensor, a terrestrial magnetism sensor, and a microcomputer.

6. A vehicle navigation system as in claim 1, wherein said means for guiding includes a microcomputer.

7. A vehicle navigation system as in claim 1, wherein said means for selecting includes a microcomputer.

8. A vehicle navigation system as in claim 1, wherein said means for displaying includes a CRT.

9. A vehicle navigation system as in claim 1, wherein said means for displaying includes an LCD.

10. A vehicle navigation system as in claim 1, wherein said means for sending includes a touch-screen switch.

11. A vehicle navigation system, which comprises:
    a CD ROM for storing and retrieving map data;
    a manually operated touch-screen switch effective to send a signal for commanding computation of a route;
    a shaft sensor;
    a terrestrial magnetism sensor;
    said shaft sensor and said terrestrial magnetism sensor sending signals that determine a present location of a vehicle;
    a microcomputer;
    said microcomputer including means for computing from said map data an optimal route for said vehicle from a starting point to a destination;
    said microcomputer further including means for guiding said vehicle along said optimal route;
    said microcomputer receiving said signals to detect a deviation of said vehicle from said optimal route;
    said microcomputer including means for signalling said deviation;
    a CRT display including means for indicating that said vehicle is off said optimal route when said microcomputer signals said deviation;

said microcomputer including means for recomputing said optimal route when said deviation is detected;
said microcomputer further including means for selecting a new starting point for said recomputed optimal route; and
said new starting point being selected to be forward of said present location of said vehicle at a distance which is sufficient to ensure that a recomputation of said optimal route is completed before said vehicle arrives at said new starting point.

* * * * *